United States Patent [19]
Leipold et al.

[11] Patent Number: 5,419,516
[45] Date of Patent: May 30, 1995

[54] DEVICE FOR COUPLING AT LEAST TWO SPACECRAFT AND USE OF THE DEVICE FOR REPAIRING TETHER DAMAGE

[75] Inventors: Manfred Leipold, Troisdorf; Jürgen Puls, Gilching; Heiner Barth, Herrsching; Eduard Igenbergs; Alexander Hornik, both of München, all of Germany

[73] Assignee: Deutsche Forschungsanstalt für Lüft- und Raumfahrt e.V., Linder Höhe, Germany

[21] Appl. No.: 135,989

[22] Filed: Oct. 14, 1993

[30] Foreign Application Priority Data

Oct. 16, 1992 [DE] Germany ............... 42 34 875.7

[51] Int. Cl.⁶ .................................... B64G 1/62
[52] U.S. Cl. ........................... 244/161; 244/158 R
[58] Field of Search ............. 244/158 R, 161, 131

[56] References Cited

U.S. PATENT DOCUMENTS

| | | | |
|---|---|---|---|
| 3,362,656 | 1/1968 | Wyatt | 244/158 |
| 4,083,520 | 4/1978 | Rupp et al. | 244/161 |
| 4,580,747 | 4/1986 | Pearson | 244/158 R |
| 4,582,277 | 4/1986 | Von Tiesenhausen | 244/161 |
| 4,923,151 | 5/1990 | Roberts et al. | 244/158 R |

*Primary Examiner*—Andres Kashnikow
*Assistant Examiner*—Virna Lissi Mojica
*Attorney, Agent, or Firm*—Browdy and Neimark

[57] ABSTRACT

A device for coupling at least two spacecrafts, the latter being connected by means of at least two tether lines, between which a plurality of cross-connections are provided which run parallel to each other at a right-angle or any other angle to the tether lines so that the length of the coupled tether lines is far greater than the dimensions transverse to the imaginary longitudinal axis of the tether system. By the introduction and use of such multiple tether systems a redundant system has been made available for tether technology. As a result, the probability of failure or dropout of such a multiple tether system has been greatly reduced or largely excluded.

10 Claims, 2 Drawing Sheets

DEVICE FOR COUPLING AT LEAST TWO SPACECRAFT AND USE OF THE DEVICE FOR REPAIRING TETHER DAMAGE

BACKGROUND OF THE INVENTION

1. Field of the Invention

The invention relates to a device for coupling at least two spacecraft by means of a tether or cable connection and the use of such a device for repairing tether damage.

2. Description of the Prior Art

In U.S. Pat. No. 4,824,051, a device for coupling two spacecraft is described in which a cable is provided as coupling means.

Additional damage risks are encountered when using tether technology in space travel due to the particular system configuration, for example due to the exposed cable area per unit time. A particular risk is represented by a cable severance due to technical or mechanical defects, dynamic instabilities or ambient conditions, for example in the form of natural and/or artificial objects in space, chemical reactions with the atmosphere or the influence of radiation, which can lead to total loss of the mission.

With the monotethers used hitherto, after tether severance due to the effects of orbital mechanics, reestablishing the original tether configuration is possible, if at all, only with extremely great technical expenditure.

So far, in experimental orbital preliminary tests, for tether technology monocables were used, for example in conjunction with Gemini 11. Furthermore, in the first scientific tether missions, for example in the TSS-1 program, once again only conductive or non-conductive monocables were employed. Within the framework of the aforementioned TSS-1 program, theoretical investigations were made with regard to an inspection and possible repair of damaged monocable tethers.

An estimation of the probability of a cable severance (with up to five possible severances per year) showed that due to such tether severances the risk of a space mission is unacceptable high. In many applications planned, severance of a monocable could possibly lead to the loss of at least one of the tethered systems, By overdimensioning the diameter of a monocable, the cable mass is increased by the square thereof without thereby reducing the cable severance probability to the same extent. For this reason, with the concepts of tether technology used and proposed today in space travel, only short missions are possible.

As already stated, in the event of tether severance reestablishment of the tether configuration is possible only with very great effort and the resulting high costs, due to the diverging orbital paths of the separate space systems resulting high costs, due to the diverging orbital paths of the separate space systems resulting from tether severance, this in turn being due to the gravity gradient forces.

SUMMARY OF THE INVENTION

The object of the invention is therefore to provide a device for coupling at least two spacecraft with which the risks of a space mission due to tether cuts are greatly reduced and employment of which permits repair of a tether severance.

The invention therefore proposed a device for coupling at least two spacecraft by means of a tether connection wherein the connection is formed by at least two tether lines between which a plurality of cross-connections are provided, the length of the coupled tether lines being far greater than the dimensions transverse to the imaginary longitudinal axis of the tether system.

The invention provides multiple tether or cable systems in which at least two longitudinal cable or tether lines are connected by flexible and/or rigid webs or rungs which are formed as cross and/or diagonal connections. By the introduction and use of such multiple tether or cable systems, the tether technology has been provided with a redundant system. As a result, the probability of failure or dropout of such a multiple tether system is greatly reduced or substantially excluded.

The structure and configuration of the multiple tether system may be selected as desired for the particular purpose and correspondingly optimized. Thus, for example, with regard to the particular use the number of longitudinal tethers, their respective spacing, the number, spacing and technical configuration of the webs or rungs in the form of cross and/or diagonal connections, and their nature, may be selected and fixed as desired.

In the event of severance of a single tether of the multiple tether unit, the tether configuration can be reestablished relatively simply in that the remaining undamaged tether lines are employed to find the damage and for guiding corresponding repair vehicles, for example a space crawler, to the location of the damage in the form of tether severance. Thus, the main cause of failure due to tether severance, which is the primary obstacle to an operational mission, is eliminated according to the invention by a single or possibly even multiple redundant system in the form of the correspondingly configured multiple tether system.

BRIEF DESCRIPTION OF THE DRAWINGS

The invention will be described in detail hereinafter with reference to preferred embodiments with the aid of the accompanying drawings, wherein.

DESCRIPTION OF THE PREFERRED EMBODIMENTS

Figure 1:
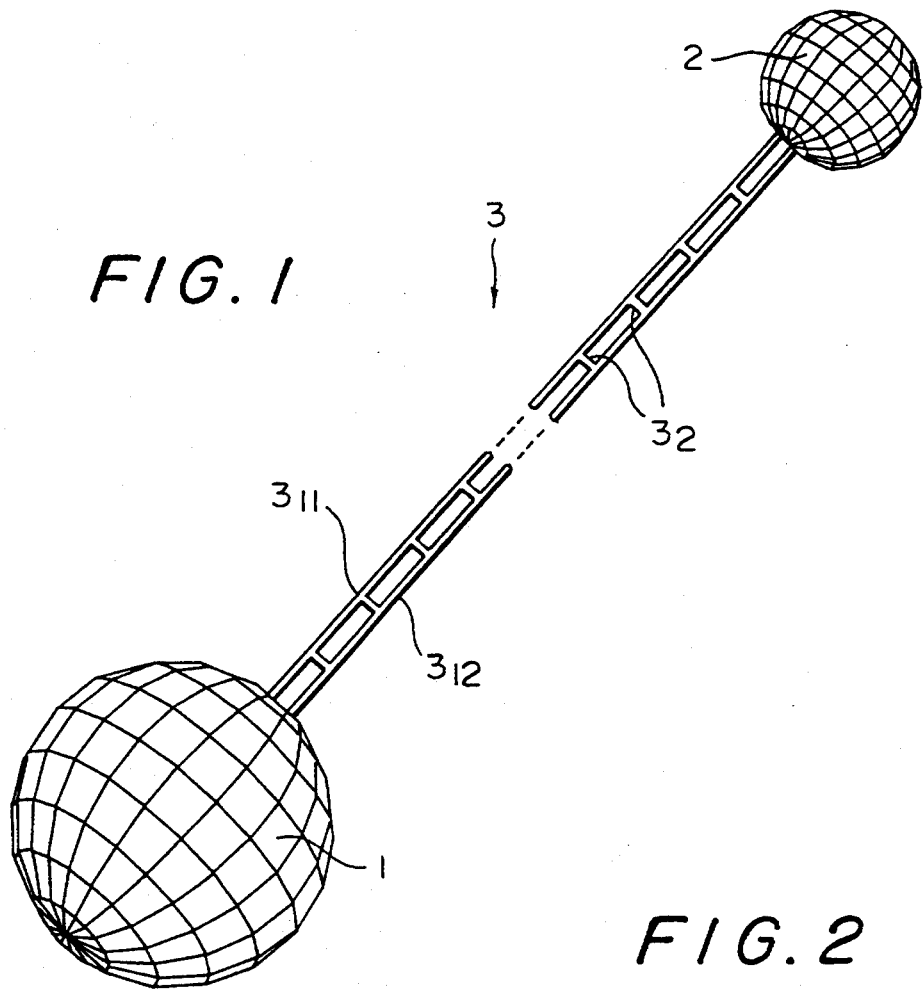
FIG. 1 shows a schematic illustration of the device according to the invention for coupling two satelites.

The schematic illustration shown in FIG. 1 of a tether system in the form of a multiple tether system 3 shows two parallel longitudinal tethers or cables $3_{11}$ and $3_{12}$ by which two satellites 1 and 2 are connected together, and the associated cross-connections $3_2$; this forms the multiple tether system 3 in the manner of a rope ladder. The multiple tether or cable system 3 may be divided into regions, hereinafter referred to as sections, which will be described with the aid of FIG. 2.

The technical properties of the multiple tether system 3 described with the aid of FIG. 1 and having two longitudinal cables and their cross-connections may be analogously assumed for all the multiple tether systems outlined above.

In the event of a severed cable, for example one of the two main lines in the form of the longitudinal cables $3_{11}$ or $3_{12}$ in FIG. 1, at any point of the tether system, apart from the defective section all other sections of the tether system remain fully functional. The technical properties necessary for the further description thus only relate to such a section.

Figure 2:
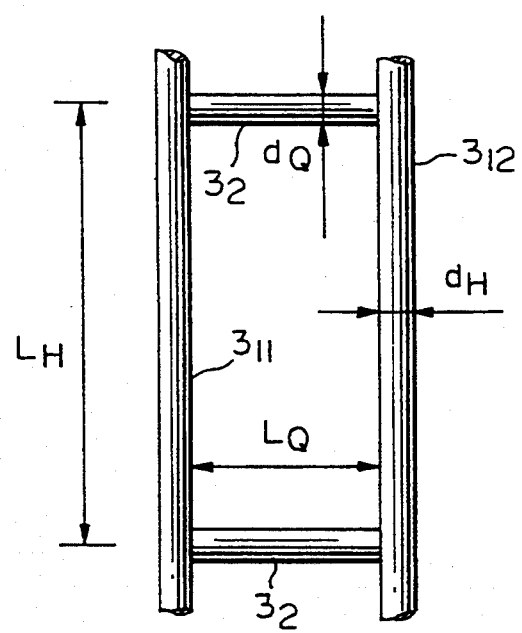
FIG. 2 is an enlarged illustration of part of the coupling device according to the invention.

As the schematic illustration of FIG. 2 shows, a section consists of parts of two main lines or longitudinal cables $3_{11}$ and $3_{12}$ with a section length of $L_H$ and two cross-sections $3_2$ having a length $L_Q$. The length $L_Q$, i.e. the spacing of the longitudinal or main cables $3_{11}$ and $3_{12}$, must be so dimensioned that the probability of a large object being able to sever both cables is very small, a value of a few centimeters already sufficing. Other important technical quantities are the diameter $d_H$ of the main lines of longitudinal cables $3_{11}$ and $3_{12}$ and the diameter $d_Q$ of the cross-connections $3_2$. Using these technical parameters, the number of possible tether severances Z per year can be obtained in accordance with the following equation:

$$Z = 0{,}35 \cdot \phi_n(d/3) \cdot 3600 \cdot 24 \cdot 365 \cdot d[m] \cdot \pi \cdot L[m] \left[\frac{1}{\text{year}}\right]$$

where $\Phi_n$ is the cumulative particle flow indicating how many particles greater than a predetermined value impinge on a unit area per interval of time. From the quantity Z calculated according to the above equation it is then also possible to determine the average time to be expected before a tether severance, i.e. the expected value of the time $T_L$ without a corresponding collision, this being calculated from the reciprocal value of Z:

$$E(T_L) = \frac{1}{Z} \cdot 365[\text{days}]$$

The probability P of at least one cable severance in n years is then given by:

$$P(T_L \leqq n) = 1 - e^{-Zn}$$

wherein P is the Poisson distribution function of the time $T_L$ without cable severance.

The probability that both cables of a section will be severed in n years is then $$P(T_L \leqq n) = (1 - e^{-Zn})^2$$

assuming that the probability is very small that one particle will sever both cables of a section.

Examples of results obtained according to the above equations for correspondingly selected diameters d and cable lengths L are shown in the following Table:

| d (mm) | d/3 (m) | $\Phi$(d/3, r = 1) | Z L = 100 km | E(T_L) L = 100 km | Z L = 200 km | E(T_L) L = 200 km |
|---|---|---|---|---|---|---|
| 0.1 | $3.3 \cdot 10^{-5}$ | $1 \cdot 10^{-6}$ | 346.8 | 1.1 | 693.6 | 0.5 |
| 0.5 | $1.7 \cdot 10^{-4}$ | $2 \cdot 10^{-8}$ | 55.1 | 6.6 | 110.2 | 3.3 |
| .75 | $2.5 \cdot 10^{-4}$ | $6 \cdot 10^{-9}$ | 15.6 | 23.4 | 31.2 | 11.7 |
| 1.0 | $3.3 \cdot 10^{-4}$ | $4 \cdot 10^{-9}$ | 13.9 | 26.3 | 27.8 | 13.1 |
| 1.5 | $5.0 \cdot 10^{-4}$ | $4 \cdot 10^{-10}$ | 2.1 | 173.8 | 2.2 | 165.9 |
| 2.0 | $6.7 \cdot 10^{-4}$ | $2 \cdot 10^{-10}$ | 1.4 | 260.7 | 2.8 | 130.4 |
| 3.0 | $1.0 \cdot 10^{-3}$ | $4 \cdot 10^{-11}$ | 0.4 | 912.5 | 0.8 | 456.3 |

Figure 3:
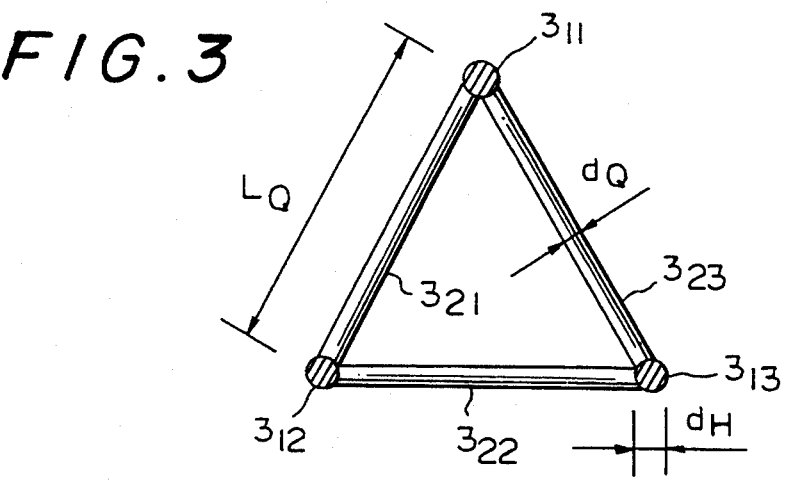
FIG. 3 is a schematic cross-sectional view of a further embodiment of a coupling device according to the invention and FIG. 4 is a schematic illustration of the use of the coupling device according to the invention for repairing a severed tether.

FIG. 3 shows a further example of a multiple tether system in the form of triple tether system, the three longitudinal or main cables $3_{11}$ to $3_{13}$ being illustrated in section while the three cross-connections are denoted by $3_{21}$ to $3_{23}$. The diameter particulars entered $d_H$ and $d_Q$ correspond to those of FIG. 2. When more than three longitudinal or main cables are provided the cross-connections may also be star-shaped in cross-section, i.e. arranged in a so-called "star-connection". Such a star unit may also be coupled to a "circular unit".

With the design of the cross-connections $3_2$ (in FIG. 2) and $3_{21}$ to $3_{23}$ (in FIG. 3), in principle a distinction can be made between rigid connecting rungs and elastic connections. Furthermore, the connections between the rungs and the longitudinal or main cables can be established by various methods, that is by rigid connections, such as clampings, (thermoplastic) weldings, adhesion, and the like, or by elastic connections, such as by means of clamping sleeves, weldings, interlacings of fibres, for example with ropes by splicing, or again by adhesion and the like.

Figure 4:
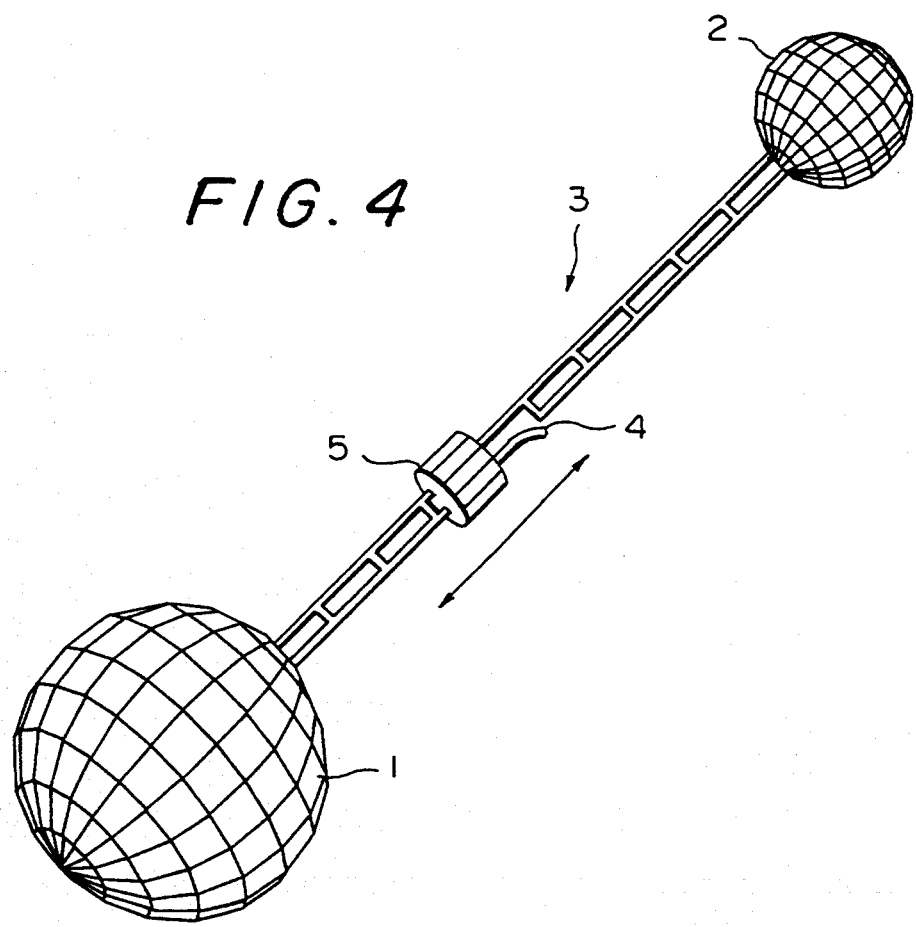

FIG. 4 indicates schematically repair of a cable breakage 4. On occurrence of a cable severance 4, using a corresponding remote-controlled repair device 5, such a defective area can be repaired. For this purpose, as repair device a so-called space crawler 5 already described in monotether technology may for example be used. For this purpose the space crawler 5 is guided along the intact sections of the multiple tether system 3 in FIG. 4 for example from the satellite 1 up to the location (in the form) of a cable severance 4. Using the space crawler 5 it is then for example possible to repair the cable severance 4 illustrated in FIG. 4. As long as further guiding of the space crawler 5 along section portions which have remained intact is possible within the defective section, even spatially relatively extensive damage to a multiple tether system can be repaired.

Further possible uses of a multiple tether system according to the invention are to be found in all cases in which when monotethers are used the danger due to cable damage is too great because of particular ambient conditions, for example in radiation-exposed environments and for example overdimensioning the monocable thickness would bring technical disadvantages, for instance as regards repairability, compared with a multiple tether system.

What is claimed is:

1. A device mechanically coupling at least two spacecraft by means of a tether connection, wherein the connection is formed by at least two tether lines connected together by a plurality of cross links, the length of the tether lines being greater than dimensions transverse to the imaginary longitudinal axis of the tether system by at least a factor of $10^6$.

2. A device according to claim 1, wherein for coupling at least two spacecraft a number of cross-links are arranged and tensile forces are transmitted via the cross-connections.

3. A device according to claim 1, wherein the cross-links are arranged in the form of transverse cables parallel to each other at a right-angle or any other angle to the longitudinal tether lines.

4. A device according to claim 1, wherein the spacecraft are connected together by at least three longitudinal cables, the at least three longitudinal cables being arranged in cross-sectional view at the corners of an equilateral two-dimensional geometrical configuration, and the longitudinal cables are connected together by cross-links.

5. A device according to claim 1, wherein the longitudinal cables and the cross-links are spliced together at connecting points.

6. A device according to claim 1, wherein the longitudinal cables and the cross-links are connected together by means of elastic flanges.

7. A device according to claim 1, wherein the longitudinal cables and the cross-links are connected rigidly together by clamps.

8. A device according to claim 1, wherein the longitudinal cables and the cross-links are adhered together at connection points.

9. A device according to claim 1, wherein for elastic coupling of spacecraft the longitudinal tether lines have elastic properties.

10. A device for coupling spacecraft according to claim 1 for repairing a damaged multiple tether system wherein a repair vehicle is guided along undamaged sections of the multiple tether system up to a defective area for repairing a damaged point.

* * * * *